Jan. 6, 1942.    I. KITROSER    2,269,373
REMOTE CONTROL FOR SERIAL CAMERAS
Original Filed April 21, 1937    2 Sheets-Sheet 2
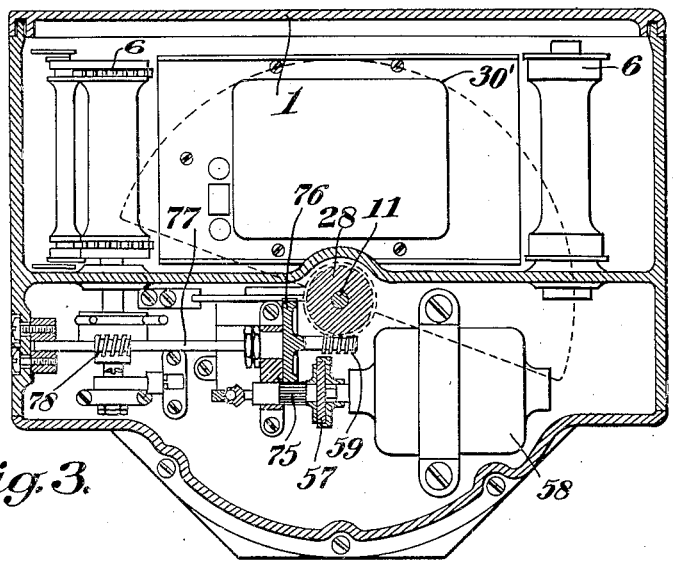
Fig. 3.
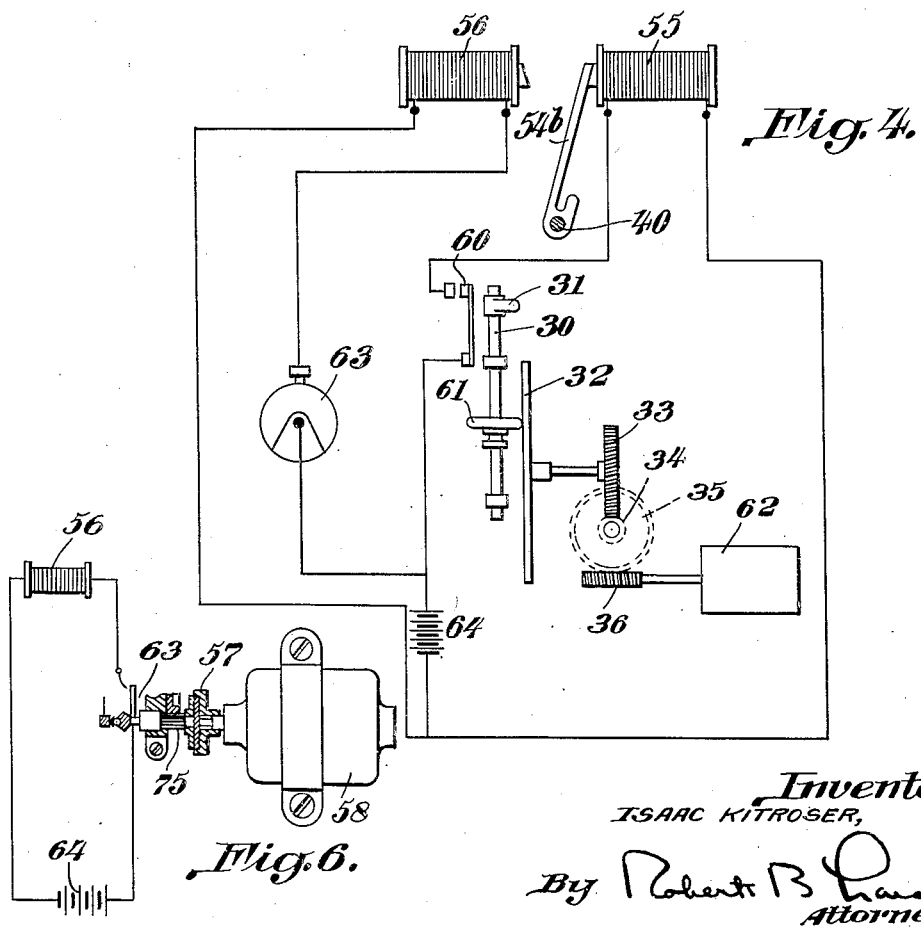
Fig. 4.
Fig. 6.
Inventor.
ISAAC KITROSER,
By Robert B. Larson
Attorneys.

Patented Jan. 6, 1942

2,269,373

UNITED STATES PATENT OFFICE 2,269,373

REMOTE CONTROL FOR SERIAL CAMERAS

Isaac Kitroser, Viroflay, France, assignor to Société Bronzavia, Courbevoie, Seine, France, a society of France Application October 11, 1938, Serial No. 234,440, which is a division of application April 21, 1937, Serial No. 138,254. Divided and this application July 24, 1939, Serial No. 286,242. In Belgium April 25, 1936

7 Claims. (Cl. 88—16)

The present application which is a division from my copending patent application Serial No. 234,440, filed October 11, 1938, (Patent No. 2,-234,410 issued Mar. 11, 1941) said latter application being itself a division from my copending patent application Serial No. 138,254, filed April 21, 1937, (Patent No. 2,187,128, issued Jan. 16, 1940) relates to photographic cameras, and particularly to cameras of the motor-actuated type. Cameras according to the present invention are especially useful in serial photography, but it will be understood that their application is not limited to this particular field and they may, for instance, be used in any cases where there is a call for a large series of automatically-recorded photographs.

According to an essential feature of the present invention, I combine with a photographic camera, for example for serial photography, having motor-operated devices, for setting the shutter and for moving the film or sensitized layer, means for producing electric current impulses for controlling the operation of said motor.

In an embodiment of my invention I provide means for regulating the rate of the current impulses, whereby the rate at which the photographs are serially recorded is controlled.

In another embodiment of my invention, I use the electrical impulses to operate an electromagnet, and the armature of this magnet, when attracted by the latter, is arranged to permit the setting of the shutter and the advancement of the film.

This electro-motor may, by means provided for the purpose, be kept in operation after the impulses have ceased and until the shutter-setting and film-shifting operations are completed, whereupon this electro-motor is automatically put out of operation.

In a further embodiment of my invention, I employ the armature of this electro-magnet to effect the release of the camera shutter.

To facilitate understanding of the present invention and to enable it to be carried into practical effect, drawings illustrating one example of embodiment have been appended hereto, and will now be referred to. It is to be understood, however, that other forms of the invention are possible.

In the drawings:

Figure 1 is a view into the interior of a camera, more especially intended for serial photography, constructed in accordance with the invention.

Figure 2 is a section on II—II of Fig. 1.

Figure 3 illustrates the actuating parts of the camera partly in plan and partly in horizontal section.

Figure 4 is a diagram of the device and electrical connections for producing electrical current impulses, which are used in this embodiment of the invention.

Figure 5 illustrates, on a larger scale, the releasing means for the camera shutter.

Figure 6 is a detail view showing the means for connecting motor 58 to actuate disc 63.

In the drawings, 1 represents the casing of the photographic camera, this casing including chambers 3 and 4. The chamber 3 contains the devices for setting and releasing the shutter, and the means for operating these setting devices and advancing the film strip. The chamber 4 contains the film supplying and receiving magazines between which the film moves for exposure, but for the sake of clarity these have not been shown in the drawings. Also mounted in chamber 4 are the drums 6 which serve to drive and guide the film.

The shutter is of the focal-plane type and has two blades 9 and 10, arranged on a shaft 11 and defining a slot of variable dimensions between them. When the film is to be exposed this slot passes in front of the image window 30' of the camera so that, inter alia, the period of exposure is dependent on the width of the slot.

The shutter is actuated by a spring 20 which must be tensioned with this object. One end of the spring 20 is connected to the shaft 11 and its other end engages a rotatable spindle 27 which is adapted to be rotated to tension the spring 20 and set the shutter.

The motive power for setting the shutter and advancing the film by the roller 6 is obtained from an electric motor 58 which drives a shaft 77 through a clutch 57 and a toothed drive 75, 76. Mounted on shaft 77 are worms 78 and 59, the first of which actuates the roller 6 for forwarding the film strip and the second of which meshes with a worm wheel 28 connected to the spindle 27.

The motor 58 is preferably of the permanently running kind, so that the shaft 77 will be rotated, and the motion transmitted to the shutter setting device and the film forwarding roller 6, as soon as the parts of clutch 57 are coupled.

In accordance with the invention, current impulses are used to control the operation of the clutch 57, these impulses being produced by the apparatus whose lay-out is depicted in Fig. 4. This apparatus includes a shaft 30 to which is 6. In a system as claimed in claim 5, said first motor operating continuously, said first connecting means including coupling means, and said means to render said mechanism operative including means to engage said coupling means.

7. In a system as claimed in claim 5, said first motor operating continuously, said first connecting means including coupling means, and said means to render said mechanism operative including means to engage said coupling means, said means to move the armature to the other of said positions comprising a second electromagnet, a source of current, a circuit connecting said second electromagnet to said source, and interrupting means in said circuit connected to said film-feeding means.

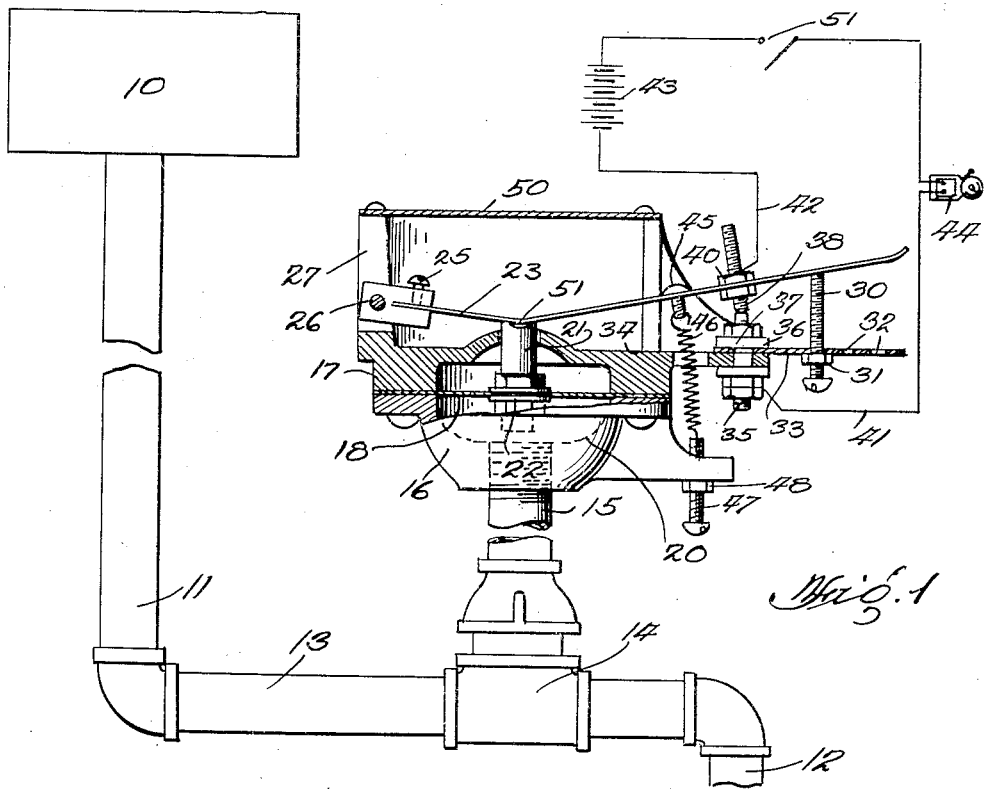
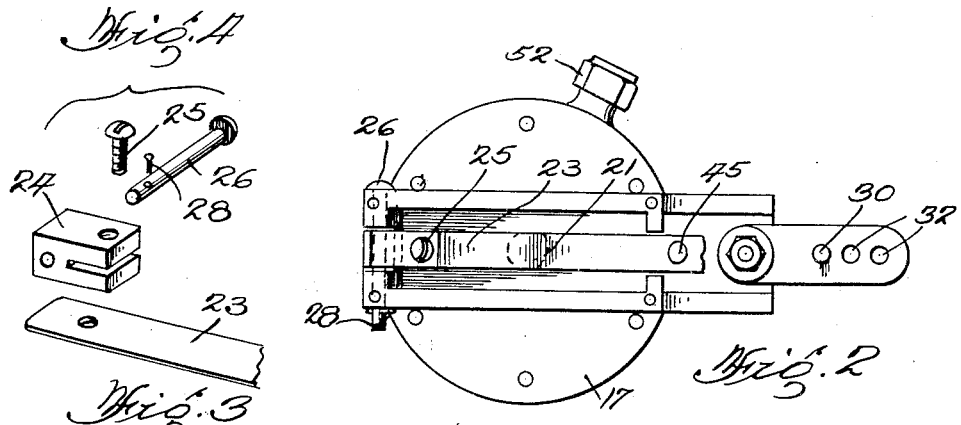
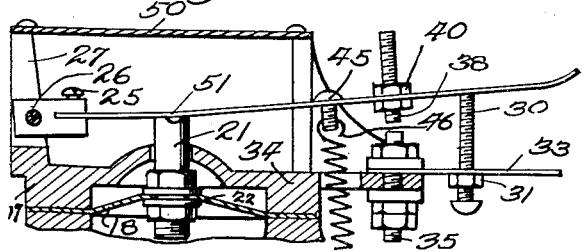

ISAAC KITROSER.